(12) United States Patent
Chahine et al.

(10) Patent No.: US 8,690,195 B2
(45) Date of Patent: Apr. 8, 2014

(54) FLEXIBLE ELEMENT WITH INTEGRAL OUTER SHIELD AND/OR INNER LINER

(75) Inventors: Paul Chahine, Dacula, GA (US); Gerhard Lein, Karlsruhe-Palmbach (DE); Rolf Janssen, Atlanta, GA (US)

(73) Assignee: American BOA, Inc., Cumming, GA (US)

(*) Notice: Subject to any disclaimer, the term of this patent is extended or adjusted under 35 U.S.C. 154(b) by 138 days.

(21) Appl. No.: 12/464,256

(22) Filed: May 12, 2009

(65) Prior Publication Data

US 2009/0285626 A1    Nov. 19, 2009

Related U.S. Application Data

(60) Provisional application No. 61/052,662, filed on May 13, 2008.

(51) Int. Cl.
*F16L 21/00*    (2006.01)

(52) U.S. Cl.
USPC .......................................... 285/226; 285/227

(58) Field of Classification Search
USPC .................... 285/226–228; 138/121, 109, 30; 464/79, 80, 99
See application file for complete search history.

(56) References Cited

U.S. PATENT DOCUMENTS

| | | | | |
|---|---|---|---|---|
| 1,752,106 A | * | 3/1930 | Persons | 464/79 |
| 1,795,266 A | * | 3/1931 | Smith | 105/59 |
| 2,249,930 A | * | 7/1941 | Bailey et al. | 277/373 |
| 2,444,008 A | * | 6/1948 | Fentress | 138/122 |
| 2,547,746 A | * | 4/1951 | Cook | 285/45 |
| 2,657,074 A | * | 10/1953 | Schwester et al. | 138/121 |
| 2,657,075 A | * | 10/1953 | Schwester et al. | 138/121 |
| 2,667,370 A | * | 1/1954 | Clarke | 285/301 |
| 2,822,194 A | | 2/1958 | Fentress | |
| 3,061,039 A | * | 10/1962 | Peters | 181/233 |
| 3,090,403 A | * | 5/1963 | Kroekel | 138/121 |
| 3,096,104 A | * | 7/1963 | Browning | 285/226 |
| 3,106,414 A | * | 10/1963 | Peters | 285/226 |
| 3,259,405 A | * | 7/1966 | Heller | 285/226 |
| 3,284,264 A | * | 11/1966 | O'Rourke | 156/289 |
| 3,482,302 A | * | 12/1969 | Williams | 228/173.6 |
| 4,231,824 A | * | 11/1980 | Cooper | 156/73.1 |
| 4,458,722 A | * | 7/1984 | Dahn | 138/121 |
| 4,924,756 A | * | 5/1990 | Berube et al. | 92/45 |
| 6,929,034 B1 | * | 8/2005 | Larsen et al. | 138/30 |

FOREIGN PATENT DOCUMENTS

| | | |
|---|---|---|
| DE | 2700483 | 7/1978 |
| DE | 3809210 | 2/1989 |
| GB | 2129891 | 5/1984 |

* cited by examiner

*Primary Examiner* — Aaron Dunwoody (74) *Attorney, Agent, or Firm* — Wood, Herron & Evans, LLP (57) ABSTRACT

A flexible bellows used in a pipe coupling includes composite convolutions having integral extensions forming one or both of an outer shield or inner liner to enhance performance of the coupling. Embodiments incorporate dampers, hangers and convolution modifications. Various embodiments are disclosed.

12 Claims, 10 Drawing Sheets

FLEXIBLE ELEMENT WITH INTEGRAL OUTER SHIELD AND/OR INNER LINER

RELATED APPLICATION

Applicant claims the benefit of the filing date of U.S. provisional patent application Ser. No. 61/052,662 filed May 13, 2008, entitled, "FLEXIBLE ELEMENT WITH INTEGRAL OUTER SHIELD AND/OR INNER LINER", the disclosure of which is hereby incorporated herein by reference in its entirety.

FIELD OF THE INVENTION

This invention relates to flexible piping elements and more specifically to couplings for pipes, particularly useful in, but not limited to, couplings for exhaust pipes from internal combustion engines.

BACKGROUND OF THE INVENTION

Couplings for pipes, particularly exhaust pipes, have been known. Prior couplings including bellows with separate inner liners and/or separate outer shields have been used in exhaust pipe environments.

Such environments are harsh. Heat produces or influences thermal changes in such pipes and couplings. Noise, vibration and harshness (hereinafter NVH) are produced by the environment of the exhaust from internal combustion engines must be handled. Motion, in the form of bending, must be accommodated as well, as pressure changes. Aspects of convection cooing affect such pipes and couplings. Mounting points for support and suspension of such couplings vary between applications but many prior couplings are not generally flexible in the location or placement of mounts.

Known coupling apparatus deals with such concerns in a variety of ways, leaving room for a great deal of improvement. Such known apparatus typically requires a separate inner liner to limit compression of the bellows, to reduce the impact of the flowing medium to the bellows, and to reduce turbulence and/or an outer shield to limit extension, to protect the bellows from a harsh environment and to add NVH damping properties. These items, i.e. liner and/or shield are usually added at considerable cost and complexity. Mounting points and hardware require a large variety of designs, adapters and the like.

In the past, bellows have been edge welded. But edge welded bellows do not have integral liners or outer shields and lack flexibility in provisions for mounting. Hydroformed, elastomeric formed, or mechanically formed bellows have been proposed. But these are limited by the material specifications and forming processes and they require separate outer shields and/or inner liners. The same material limitations evident on conventional bellows, also constrains one of its main purposes, that being durability under flexibility. Molded bellows have the same concerns as above. Additional disadvantage of a conventional bellows as described above is the complexity required to mount/hinge support conventional bellows other than on the end of the bellows.

Accordingly, it is desired to uniquely integrate all components: bellows, outer shield, and/or inner liner, mount/hinge) together to overcome and improve the features in the prior known couplings.

It is also desired to provide considerable flexibility in the bellows' convolutions so as to better optimize the overall functionality, particularly in the environmental conditions noted above.

SUMMARY OF THE INVENTION

To these ends, the invention in preferred embodiments includes a flexible element which is the basis for an elastic connection of pipes and which compensates for thermal influences, pressure changes, motion (such as bending), noise, vibration and harshness (NVH), or provides convection cooling and other such benefits.

While existing art contains flexible gas tight elements that consist of a bellows provided with a separate inner liner, and/or a separate outer shield, this invention contemplates a bellows having an integral outer shield and/or an integral inner liner. Several components can be added to this bellows with integral outer shield and/or integral inner liner to achieve additional functionality in a unique structure. The invention can be made with a variety of materials and with any number of homogeneous or variant plies thicknesses of the materials.

The integral construction noted provides a gas tight but flexible connection that is capable of compensating, and performing the benefits of, compensating thermal influences, pressure changes, motion (such as bending), noise vibration and harshness (NVH), and other such environmental conditions.

Such a new concept improves piping system life, NVH compensation assembly ease, available cooling surface and provides flexibility in mounting/hinging points. The invention does this at a lower overall cost by integrating the inner liner and/or the outer shield with the bellows.

Accordingly, the present invention provides a superior and lower cost product with integrated additional functionality like mounting/hinging points.

In more detail, the integral bellows construction of this invention is achieved by adhering (by welding, chemical bonding, or other such method of adhering) two formed (by stamping, molding, cutting or other such forming method) discs together to form a convolution of the bellows. The overlap at the two adhered ends is used to form the outer shield and/or inner liner. Any number of convolutions can be adhered to form a larger and more flexible bellows with an integral outer shield and/or integral inner liner. The configuration of the bellows can take into consideration the number of plies thickness, the various end configuration, the various materials and thicknesses, the overlap geometry for the outer shield or inner liner, and other such variations. The overlap areas (at the ends of the discs) can be modified to add additional features such as a rod or cable to limit extension or provide mounting. Damping material can be added between the convolutions and trapped by the end features to create a bellows assembly with damping properties.

These and other objectives and advantages will be more readily apparent from the following written description of the preferred embodiments and from the drawings in which:

BRIEF DESCRIPTION OF THE DRAWINGS

Center lines "CL" as indicated are shown in selected FIGS. as center lines or axes as appropriate for clarity where the construction is symmetrical thereabout.

DETAILED DESCRIPTION OF THE INVENTION

It should be readily understood that the components and steps of the invention, as generally described and illustrated in the Figures herein and accompanying text, can be arranged and designed in a wide variety of different configurations while still utilizing the inventive concept.

For example, the number of disc members and the convolutions of any bellows can be varied as well as their radial and circumferential extension, overlap configuration and the like.

Thus, the following more detailed description of the preferred embodiments of the system and method for the present invention, as presented in the Figures and accompanying text, is not intended to limit the scope of the invention, as claimed, but it is merely representative of the presently preferred embodiments of the invention. Moreover, it will be understood that the embodiments described are primarily referred to as "bellows" but particularly and preferably comprise couplings for pipes.

The preferred embodiments of the invention will be best understood by reference to the drawings wherein like parts or steps are designated by like numerals throughout. In the FIGS., a dash-dot center line is provided for clarity with the bellows being generally symmetrical thereabout excepting FIGS. 4 and 4A.

Figure 1:
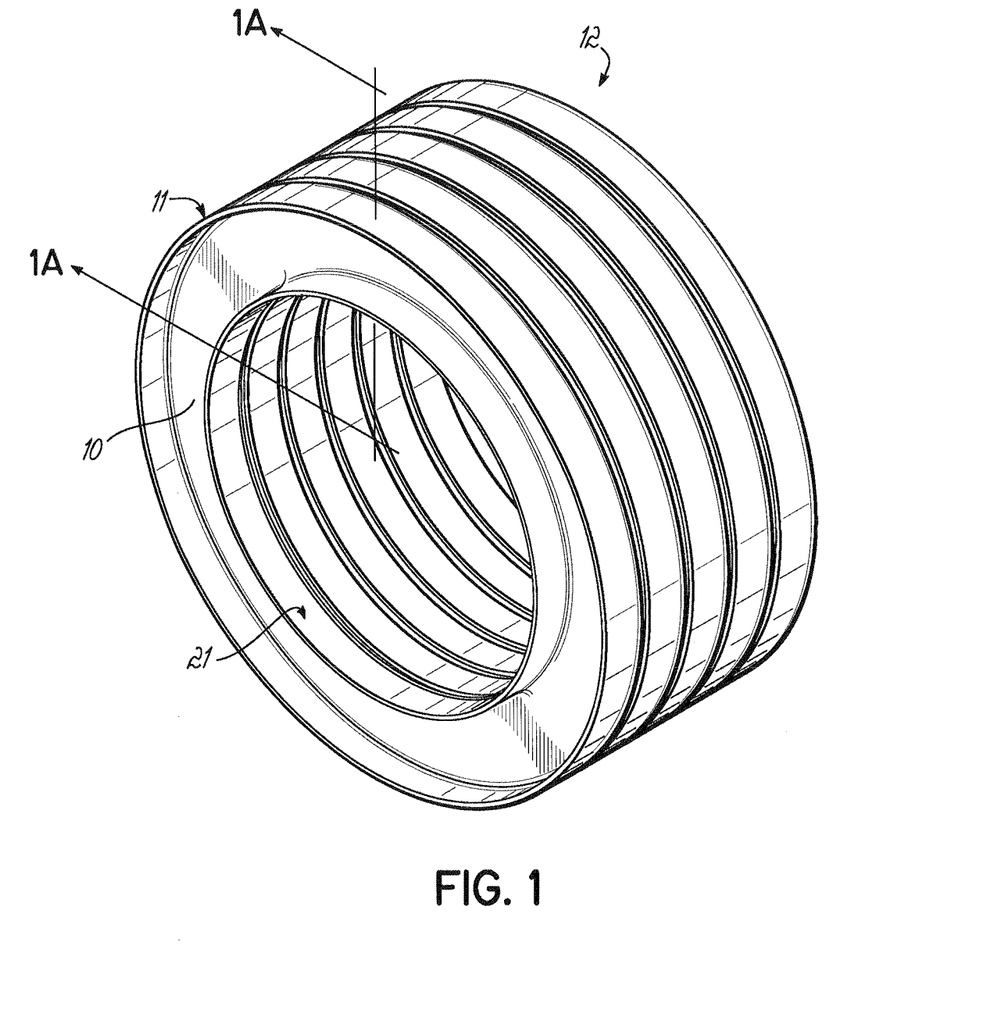
FIG. 1 is an isometric view of one embodiment of the invention with the bellows defining an integral outer shield and integral inner liner.
Figure 1A:
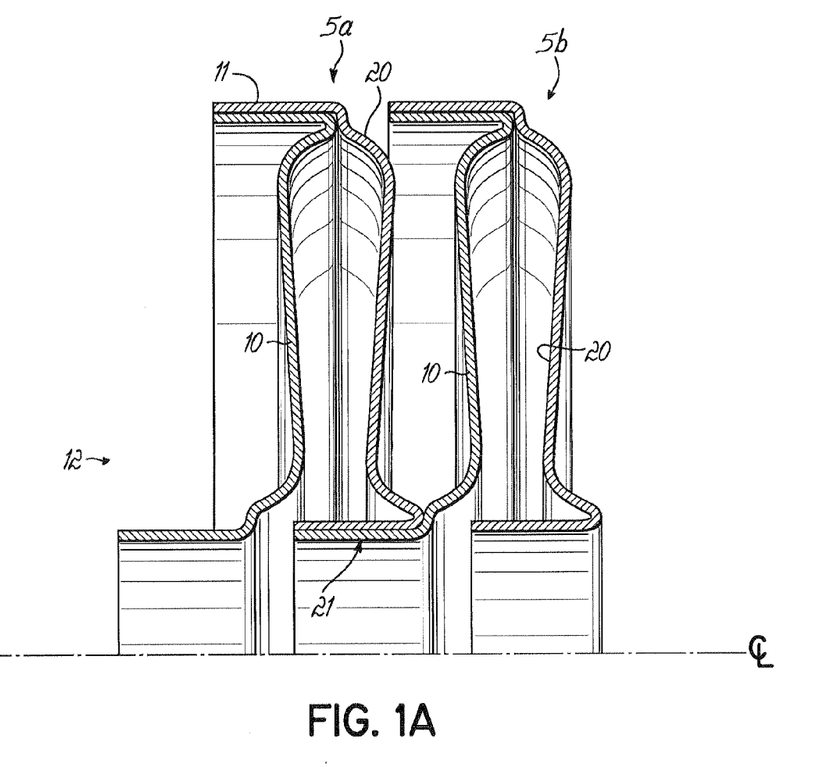
FIG. 1A is a cross-section view of the invention of FIG. 1, along lines 1A-1A of FIG. 1 and showing two convolutions of a multiple convolution bellows with the inner liner and outer shield integrated with the bellows.

FIG. 1 depicts a unitary bellows unit having a plurality of convolutions, each formed by two discs 10, 20 (FIG. 1A).

Referring to FIGS. 1 and 1A, two discs are adhered to form an inner half 10 of a bellows convolution and an outer half 20 of a bellows convolution. Two or more convolutions may be adhered to form a multi-convolution bellows 5. The more convolutions added to the bellows, the larger the range of motion, the longer the durability for set deflections, and the lower the stiffness for NVH compensation properties (among other performance criteria of the bellows).

Referring to FIG. 1A, the overlap of the discs 10 and 20 of one convolution 5a create the integral outer shield 11 and the overlap of disc 20 from convolution 5a and disc 10 from convolution 5b, form integral inner liner 21. The bellows 12 is created by adhering (by welding, chemical bonding, or other such method of adhering) two formed (by stamping, molding, cutting or other such forming method) discs 10, 20 together to form a convolutions of the bellows 12. The overlap at the respective adhered ends is used to form the outer shield 11 and/or inner liner 21. The outer shield 11 serves to provide protection for the bellows 12 from the outside environment and (with additional components) provide extension limits to the bellows. The inner liner 21 serves to protect the bellows 12 from the medium in the piping system, to reduce turbulence and improve NVH properties, and to provide a compression stop.

Figure 1B:
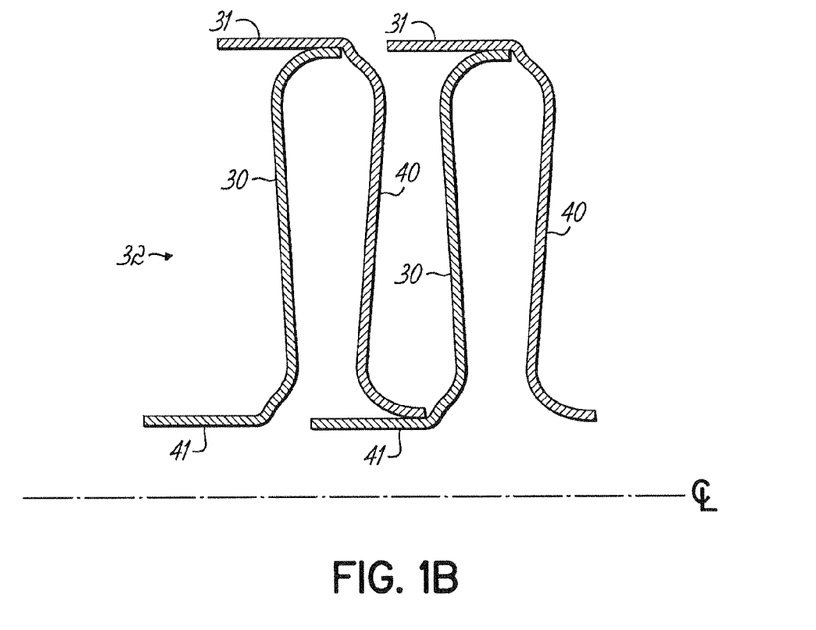
FIG. 1B is a cross-section view similar to FIG. 1A, but of an alternate embodiment of the invention with an alternative bellows disc concept, minimizing the overlap at the ends.

Referring to FIG. 1B, the inner discs 30 and outer discs 40 and the adhesion method can be designed to minimize the overlap of material and reduce material. A single ply outer shield 31 and a single ply inner shield 41 are provided in a bellows 32.

Figure 1C:
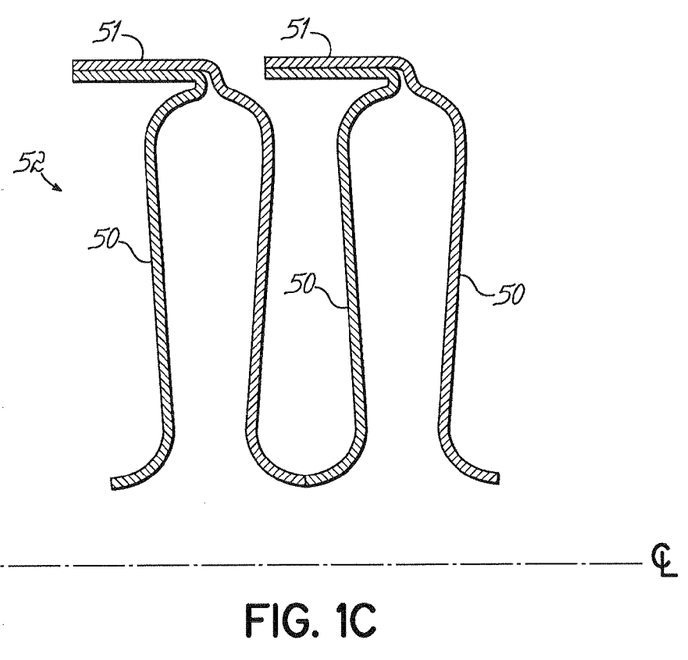
FIG. 1C is a cross-section view similar to FIG. 1A, but of another alternate embodiment of the invention with only an integral outer shield.

Referring to FIG. 1C, the bellows 52 can have inner discs 50 and outer discs 60 to create a bellows 52 with just an outer shield 51.

Figure 1D:
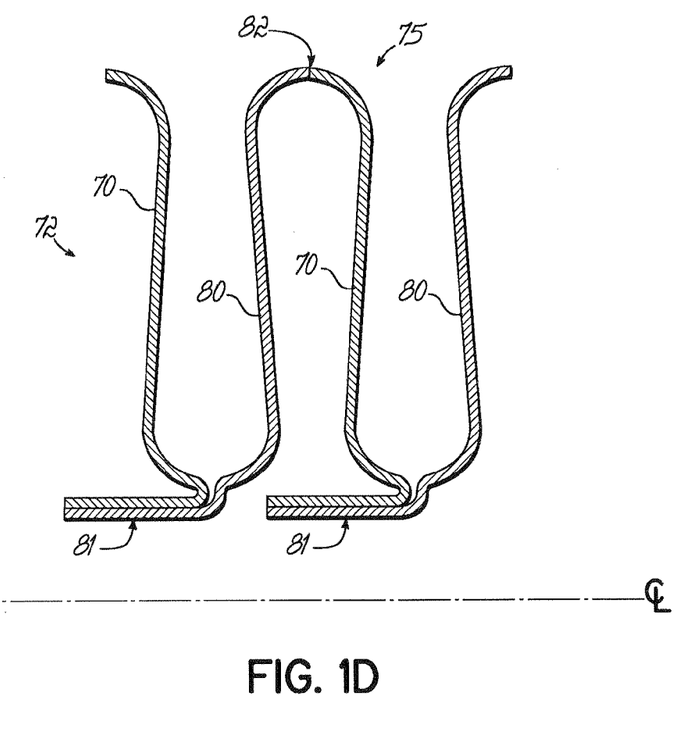
FIG. 1D is a cross-section view similar to FIG. 1A, but of another alternate embodiment of the invention with only an integral inner liner.

Referring to FIG. 1D, the bellows 72 can have inner discs 70 and outer discs 80 to create a bellows 72 with just an inner liner 81. One or more concave convolutions 75 (view from outside bellows 72) define bellows 72, each convolution defined in part by disc 70 and disc 80, joined by welding, for example, at the juncture 82 of the respective discs 70, 80 forming the respective convolution.

Figure 1E:
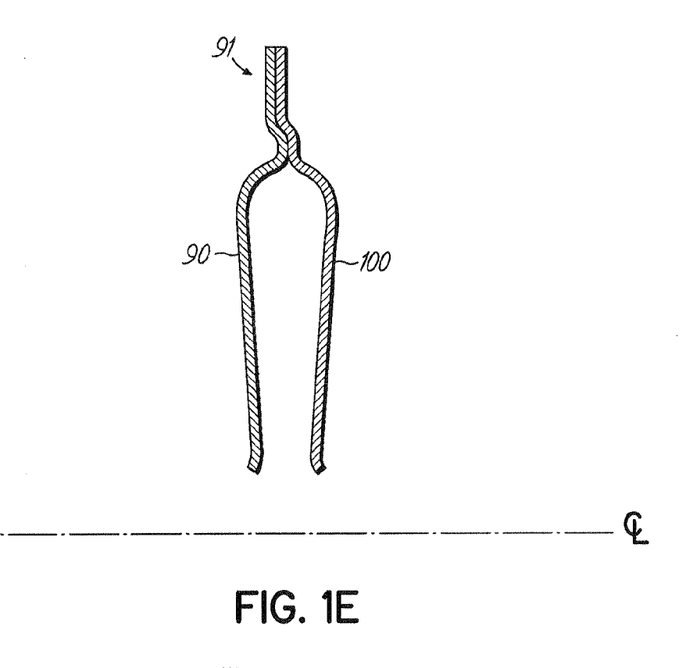
FIG. 1E is a cross-section illustrative view similar to FIG. 1A but of one convolution of a bellows with an alternative overlap end to simplify the forming process after the ends are joined.

Referring to FIG. 1E, the overlap geometry at 91 of respective inner and outer discs 90, 100 can be optimized in a number of ways to facilitate the forming of it (after adhesion) to the inner liner or outer shield as desired. FIG. 1E thus illustrates the intermediate configuration of two discs 90, 100 as initially joined together and awaiting further forming, bending, etc. of the overlap geometry 91.

Figure 1F:
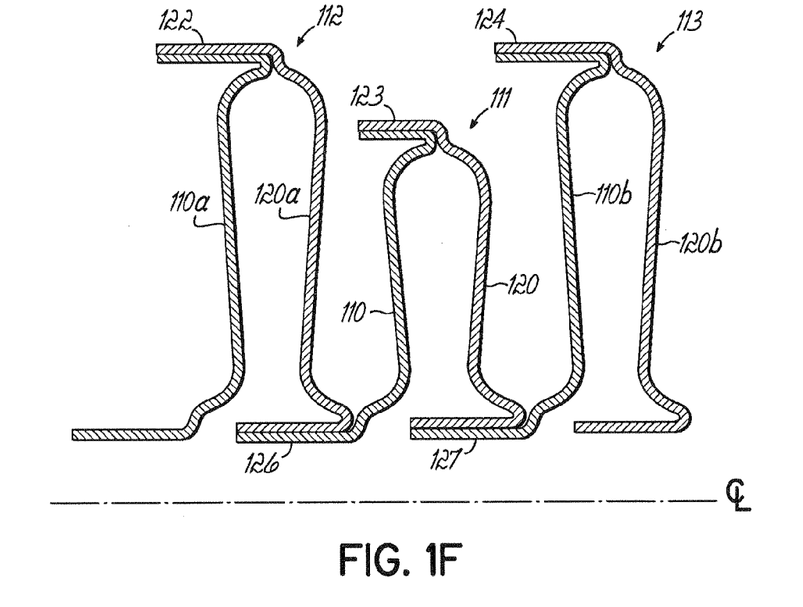
FIG. 1F is a cross-section view similar to FIG. 1A but illustrating an alternate embodiment of the invention with integral outer shields and integral inner liner and showing three convolutions of varied height to facilitate the required movement of the bellows.

FIG. 1F illustrates that the size of the convolutions can be altered to change the properties of the bellows. As in this figure, the smaller convolution 111 with inner disc 110 and outer disc 120 form a convolution that can be nested between the larger ones 112, 113 and allow for greater range of motion (i.e. bending) and NVH properties. Each of the convolutions 111, 112, 113 are formed by respective discs 110, 120; 110a, 120a and 110b, 120b. In this configuration, and for example, overlaps 122, 123, 124 form partial outer shields while overlaps 126, 127 and so on form partial inner liners.

Figure 1G:
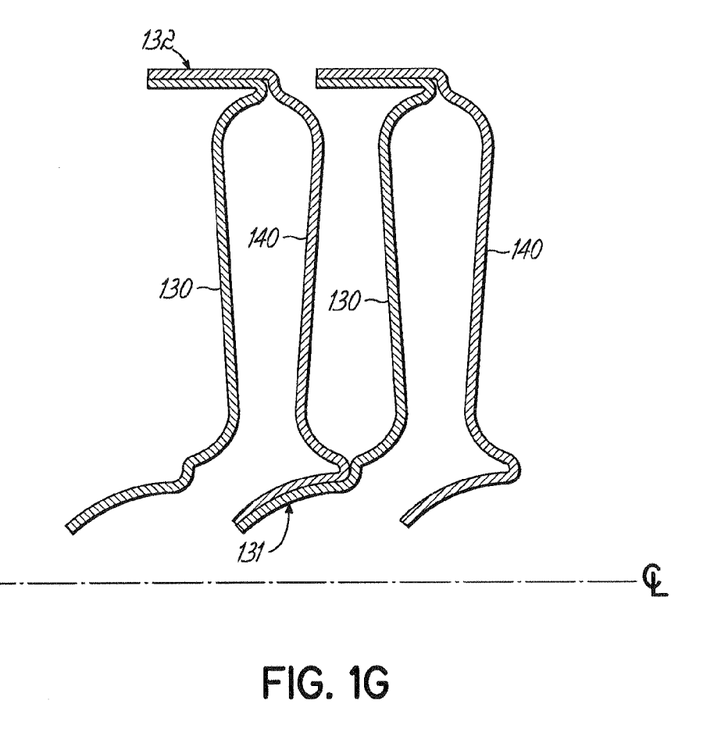
FIG. 1G is a cross-section view similar to FIG. 1A but illustrating an alternate embodiment of the invention with both an integral outer shield and an inner liner, the geometry of the inner liner can be modified to optimize the flow and NVH characteristics of the medium in the piping system, or in the case of the outer shield, the shielding properties.

Referring to FIG. 1G, the geometry of the ends of the inner discs 130 and outer discs 140 can be made in a variety of ways to optimize the inner liner 131 or outer shield for the best functional purpose, as illustrated.

In all of FIGS. 1-1G, it will be appreciated the respective shield and liner components are essentially aligned (excepting shields 122-124 and liner 131).

Figure 2:
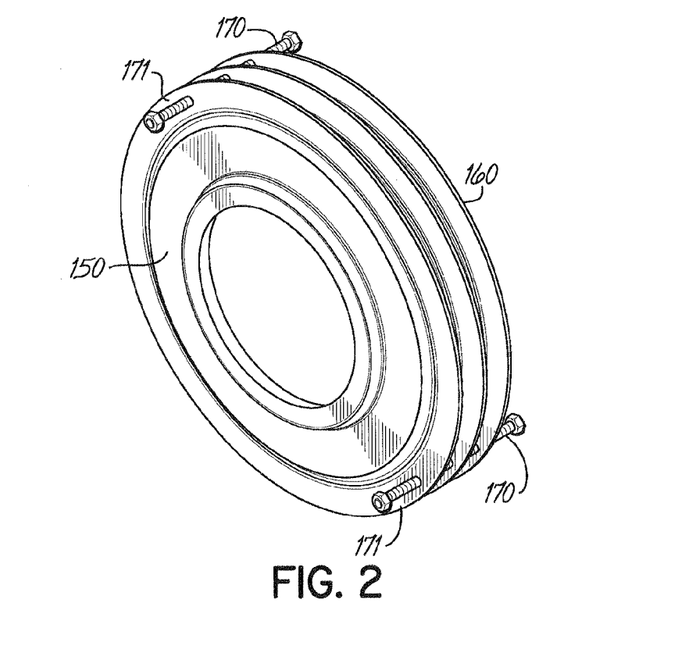
FIG. 2 is an isometric view of a bellows in an alternate embodiment of the invention with an integral inner liner and integral outer shield where the outer shield has a cable or rod threaded through holes in the outer shield to provide a bellows' extension stop.

Referring to FIG. 2, rods or cables or threaded screws 170 can be threaded through holes in the outer shield 171 (formed by discs such as 150, 160), such as suggested in FIG. 1E, to provide NVH damping and/or extension limits. Extension limits set at the rods or cables 170 prevent the bellows from extending beyond the elastic limit of the design.

Figure 4:
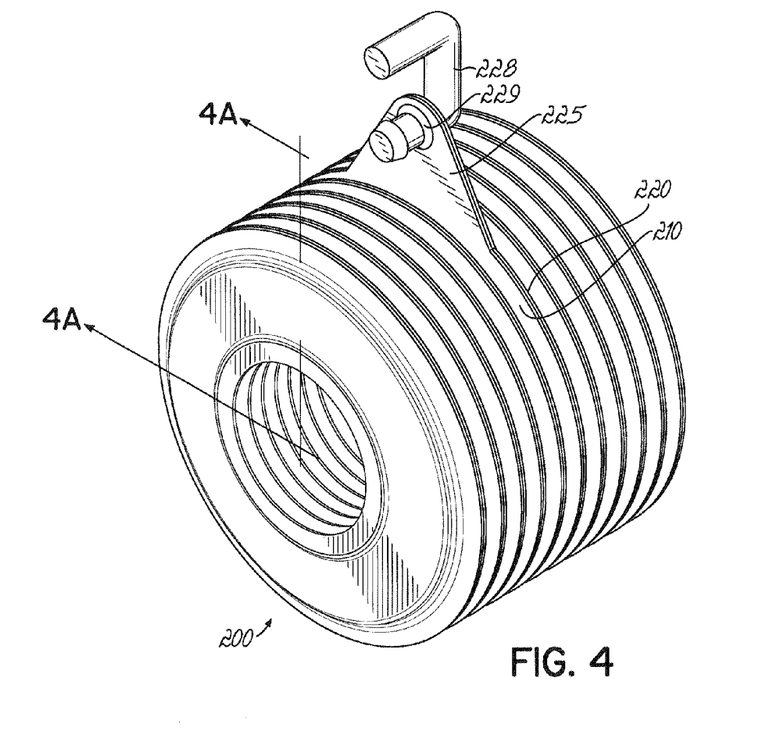
FIG. 4 is an isometric view of a bellows in an alternate embodiment of the invention with an integral mounting/hinge support, where one of the convolutions (any across the bellows can be selected depending on the application) has a special inner and outer disc defining the mounting feature.
Figure 4A:
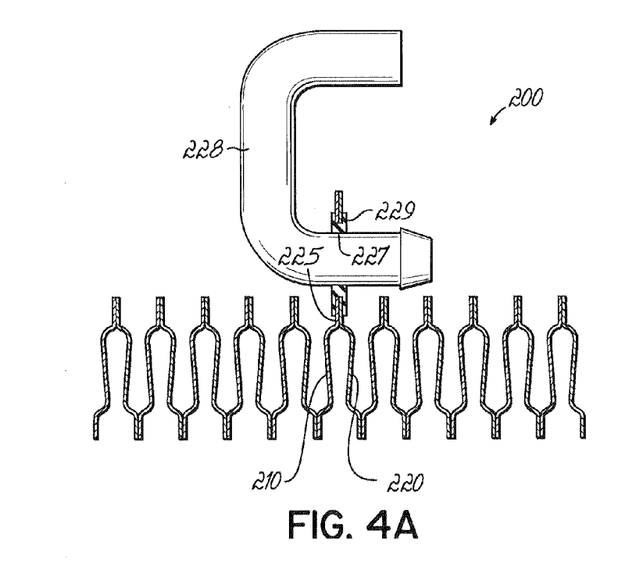
FIG. 4A is a cross-section of a bellows of FIG. 4 with an integral mounting/hinge support and showing the invention before bending of the integral inner liner and integral outer shield feature at FIG. 1A, excepting the mounting feature convolution.

In this regard, and with attention to FIG. 4A, the support 225 defines an aperture 227 for receiving a hanger 228 in an isolation grommet 229.

Figure 3:
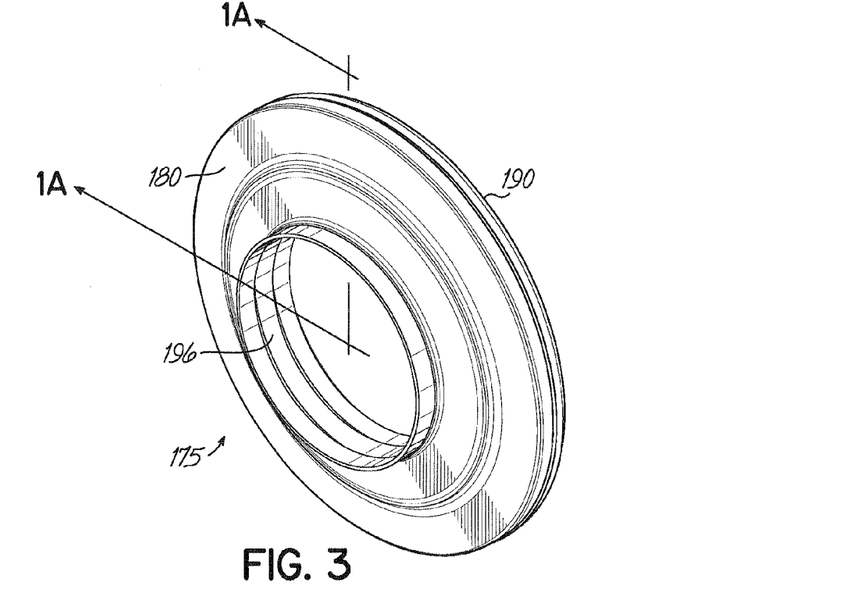
FIG. 3 is an isometric view of a bellows in an alternate embodiment of the invention with the integral inner liner and integral outer shield with a damping medium added between the convolutions and fixed by the outer shield to add damping properties to the bellows.
Figure 3A:
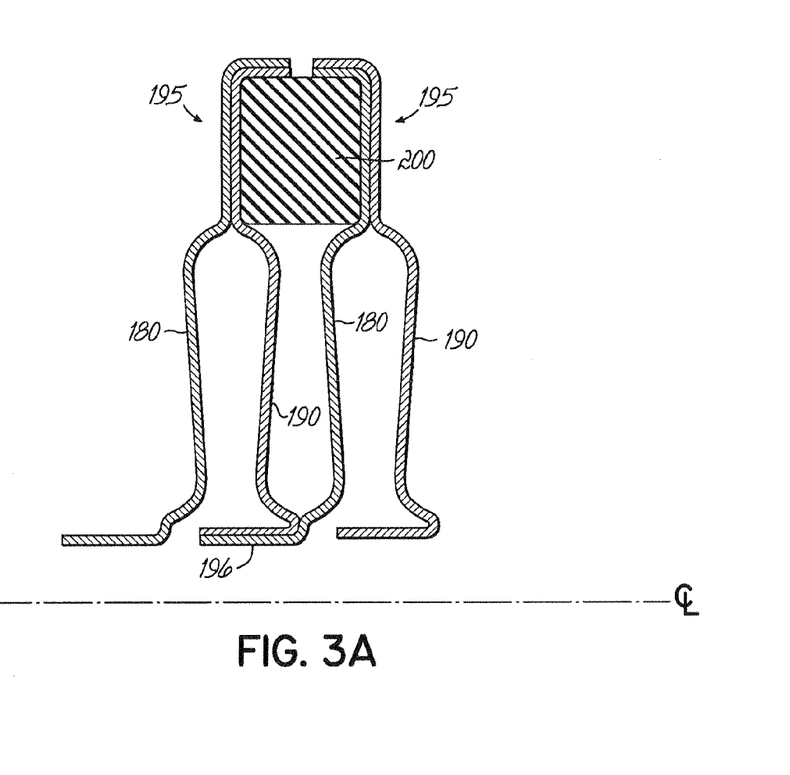
FIG. 3A is a cross-section along lines 3A-3A of a bellows of FIG. 3 with the integral inner liner and integral outer shield and a damping medium is added between the convolutions and fixed by the outer shield to add damping properties of the bellows.

Referring to the bellows 175 of FIGS. 3 and 3A, the inner disc 180 and outer disc 190 are constructed so that the outer shield 195 formed thereby defines a chamber which captures a damping medium 200 (such as mesh wire or a synthetic material) and provide damping properties of the bellows and between the convolutions illustrated. An integral inner shield 196 is formed by interior overlaps of discs 180, 190.

Referring to FIGS. 4 and 4A, the respective discs 210 and 220 of selected convolutions of bellows 200 can be designed with a feature to define a mounting/hinge support 225 as shown in one such case. The thickness of these discs can be different than the others on the bellows of selected convolutions. Also, this convolution can be located at any point along the bellows. The exact mounting configuration is dependent upon the application.

Another aspect of this invention includes consideration of and a solution to the interconnection of the elements and structures described above with relatively thicker wall connection pipes or components thereof found in, for example, an exhaust system.

More specifically, it will be appreciated that the foregoing flexible elements and bellows apparatus described above have particular applicability to, or use in, exhaust systems for internal combustion engines wherein the pipes or conduits of such systems (not shown), or their connecting structures, are relatively thicker than the members comprising the bellows components or stamping described above. In these and other cases, there is here consideration of how the flexible bellows invention described above are operably interconnected within such systems or to specific connection pipes or other exhaust components.

To this end, the invention further contemplates the combination to the bellows described above of end caps configured for welding or other attachment to the ends of the bellows and more particularly to the end bellows component, disc or stamping. The end caps are somewhat thicker than the bellows discs to facilitate welding both to the bellows and to much thicker conduits or pipe components of an exhaust system.

Figure 5:
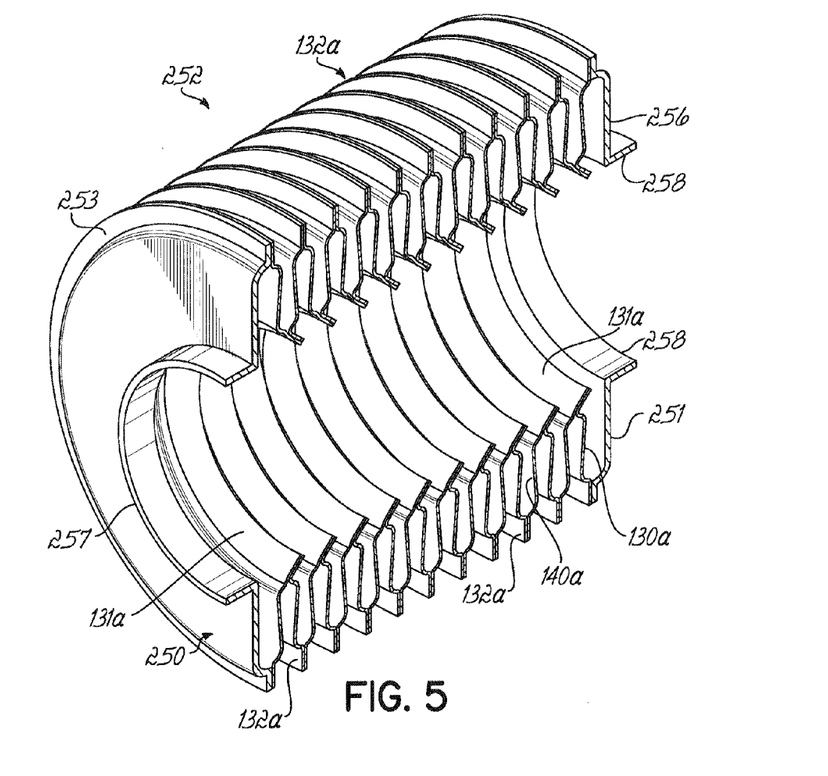
FIG. 5 is a perspective drawing illustrating the addition of end caps to an exemplary bellows unit.

This aspect of the invention is illustrated in FIGS. 5-8, where FIG. 5 illustrates in perspective the addition of end caps 250, 251 to a bellows 252, such as that illustrated previously in FIG. 1G, for example, but wherein the multiple ply flanges 132a are not formed over as are flanges 132 of FIG. 1G. Instead, the flanges are left extending radially outwardly as shown in FIG. 5. It will be appreciated that end caps 250, 251 each have a radial, outwardly extending flange 253, 254, a body 255, 256 and interior, axially extending cylindrical bosses 257, 258. Bodies 255, 256 at their outer portions generally correspond partially to the shape of the outer portions of alternative stampings 130a, 140a respectively as shown. Flanges 253, 254 are welded to the outward radial flanges 132a of the bellows. End caps 250, 251 are preferably thicker than stampings or discs 130a, 140a for example, but not so thick as to adversely affect their welding to the stampings. At the same time, cylindrical bosses 257, 258 are thick enough for welding to the end connections of pipes, tubes or conduits in an exhaust system, for example.

Figure 6:
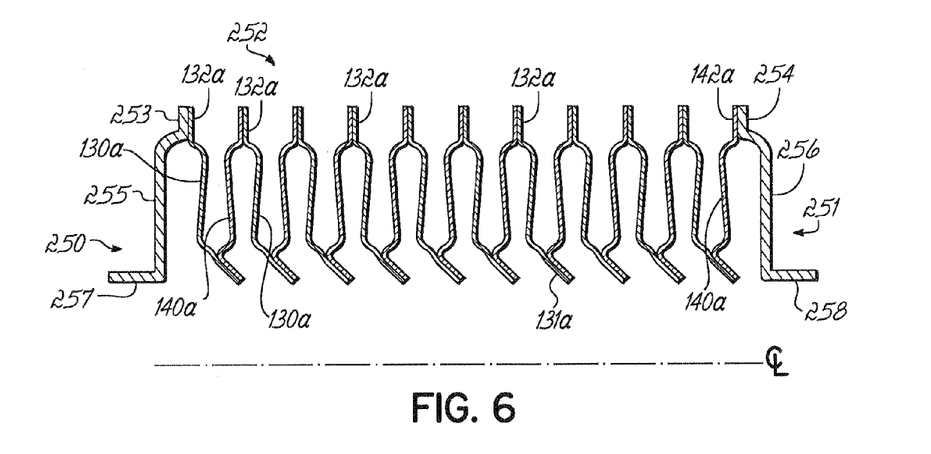
FIG. 6 is a cross-sectional view of a portion of a bellows with end caps as in FIG. 5.

Details of FIG. 5 are also shown in FIG. 6, wherein only the half of the bellows 252 and end caps 250, 251 are illustrated in side view cross-section as shown for clarity. The bellows 252 and end caps 250, 251 are developed about center line CL with inner liner flanges 131a extending inwardly as shown.

End caps somewhat similar to these as described are useful on flexible bellows of a variety of configurations as described above.

Figure 7:
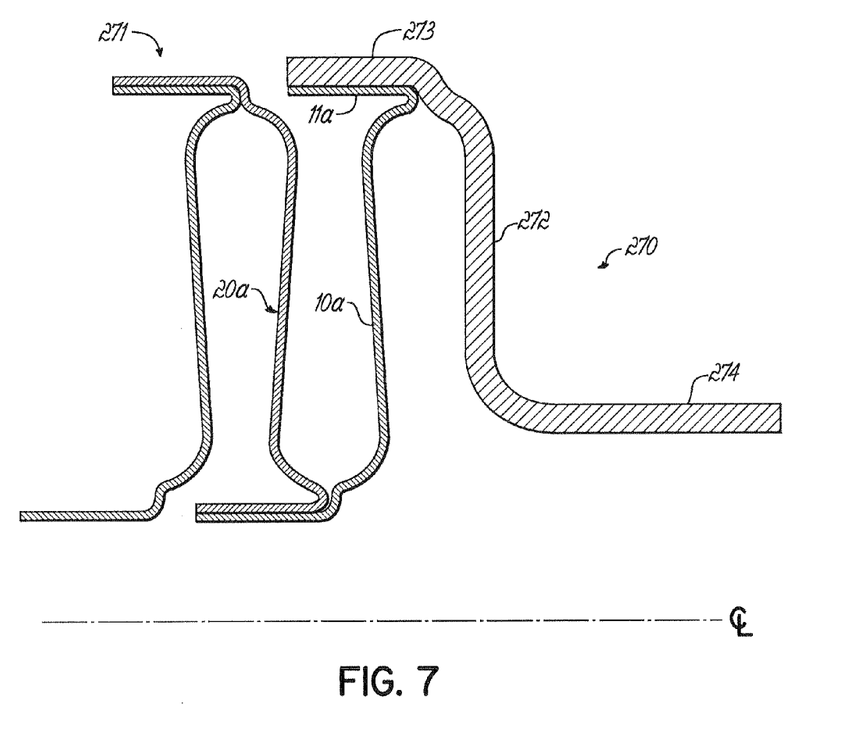
FIG. 7 is a cross-sectional view similar to FIG. 6 but of a portion of an alternate bellows with end cap.

For example, FIG. 7 illustrates an end cap 270 used with a bellows 271 of similar configuration to that shown in FIG. 1A. In FIG. 7, only one end cap 270 is shown in partial cross-section on the bellows 271, it being understood another end cap is used on the opposite end of the bellows 271.

In FIG. 7, end cap 270 has a body 272 configured at its upper end like bellows disc or stamping 20a, and a flange 273 along upper flange 11a of disc 10a. The end cap 270 has an interior, axially extending cylindrical boss 274 for connection to a pipe tubing or conduit of an exhaust system (not shown), for example.

The thickness of caps 270 is thicker than discs 10a, 20a, but not so much as to interfere with welding of flange 273 to flange 11a. In addition, its thickness facilitates its welding or connection into the thicker, more robust components of an exhaust system. For clarity, only a portion of bellows 271 end cap 270 are shown about center line CL, similar to FIG. 6.

Figure 8:
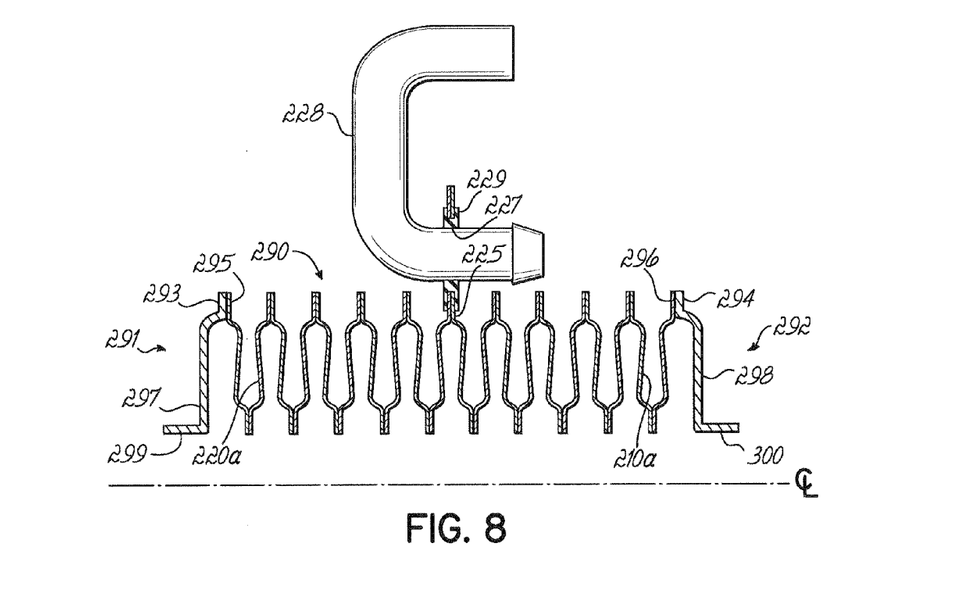
FIG. 8 is a cross-sectional view similar to FIG. 4A but showing the use of end caps in association with the bellows.

FIG. 8 illustrates a bellows 290 such as that bellows of FIG. 4A, but with end caps 291, 292 all developed about center line CL.

End caps 291, 292 have radially extending flanges 293, 294 welded respectively to flanges 295, 296 of bellows 290 as shown, with all flanges in this configuration extending radially outwardly from center line CL.

End caps 291, 292 have bodies 297, 298 formed at their upper ends like discs 220a and 210a, respectively, and interior, axially extending cylindrical bosses 299, 230 for interconnection to the components of an exhaust system, for example.

Other components are numbered and are like that of FIG. 4A.

In a yet further aspect of the invention, it will be appreciated that the outward extending flanges of the various bellows configurations of the embodiments described herein can be welded together, then fluted or splayed away from one another to present more surface area to the surrounding environment to promote cooling of the bellows and systems in which they are used. Thus, for example, the outward flanges shown in FIGS. 1A, 1C, 1E, 1F, 1G, 4A, 5, 6, 7 and 8 could be so arranged.

Figure 9:
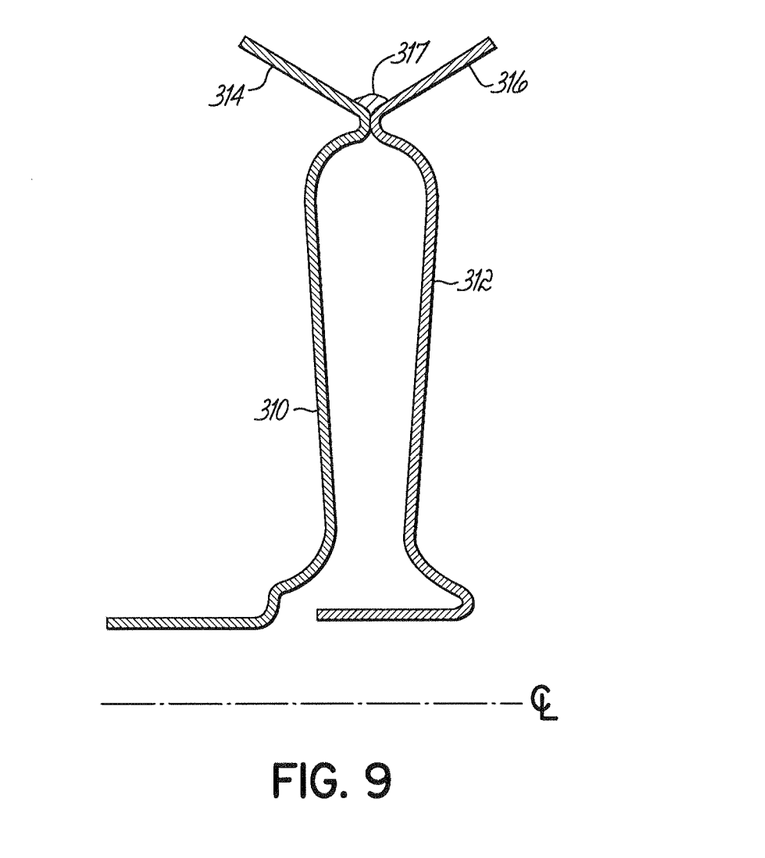
FIG. 9 is a cross-sectional view illustrating a modification of bellows-forming discs and their outer flanges to promote cooling.

FIG. 9 illustrates this aspect of the invention wherein is shown two discs 310, 312 defining a convolution of a multiple component bellows (such as those shown in various preceding FIGS.). Discs 310, 312 have outwardly extended, but splayed apart, flanges 314, 316 extending beyond weld 317 to present additional surface area exposed to the environment for cooling. Otherwise, the bellows and discs are similar to those described above.

These and other alternatives, modifications and advantages will become readily apparent to those of ordinary skill in the field to which this invention pertains and applicant intends to be bound only by the claims appended hereto.

What is claimed is:

1. A flexible coupling comprising:
    a bellow extending longitudinally in a first axial direction and defined by a plurality of radially extending convolutions, the convolutions having an axial extension,
    each convolution comprising two formed discs having spaced apart portions and having a plurality of flange portions extending outwardly of said convolutions and connected together in parallel to each other;
    said flange portions comprising an outer shield, integral with said bellows, said outer shield extending at an angle to said radially extending convolutions,
    and in an axial direction beyond any axial extension of said convolutions.

2. A coupling as in claim 1 further including flange portions disposed inwardly within said bellows.

3. A coupling as in claim 2 wherein said selected ones of said inwardly disposed flange portions extend in said first axial direction within said bellows beyond any axial extension of said convolutions and form a liner.

4. A coupling as in claim 1 wherein a convolution includes a flange portion disposed outwardly thereof and a flange portion disposed inwardly thereof.

5. A coupling as in claim 4 wherein said outward flange portion defines said shield.

6. A flexible coupling comprising:
    a bellows extending in a first direction defined by a plurality of convolutions extending in a radial direction;
    each convolution having an axial extension and defined by two formed discs having respective spaced-apart portions in an axial direction,
    at least one of said discs having a flange member;
    said flange member defining an outer shield outwardly of said bellows and extending at an angle to said radial direction and beyond any axial extension of a convolution from which said flange member extends.

7. A coupling as in claim 6 wherein a flange member of one of said discs is disposed outwardly to define said shield and a flange member of the other of said discs is disposed inwardly to define said liner.

8. A coupling as in claim 6 where each of said two discs having a flange member disposed outwardly and a flange member disposed inwardly,
    the outwardly disposed flange member of said two discs in combination defining a shield extending beyond a convolution from which said flange member extends and the inwardly disposed flange member of said two discs in combination defining a liner.

9. A flexible coupling comprising:
    a bellows defined by a plurality of convolutions having an axially extending width;
    each convolution defined by two formed discs having spaced-apart portions,
    at least one of said discs having respective flange members disposed outwardly of other portions of said discs and extending in a direction beyond the width of said convolutions;
    said respective flange members defining an outer shield of said bellows,
    said shield having an extension greater than said width.

10. A flexible coupling comprising:
    a bellow extending longitudinally in a first axial direction and defined by a plurality of radially extending convolutions, each having outer closed ends and a width in said axial direction;
    each radially extending convolution comprising two formed discs having spaced apart portions and said discs each having a flange portion connected together with another flange potion and having ends extending outwardly of said convolutions;
    said flange portions comprising outer shield portions, integral with said bellows, said outer shield portions extending at an angle to said radially extending convolutions; and
    said outer shield portions extending in said first axial direction beyond the discs or convolution from which they extend.

11. A flexible coupling comprising:
    a bellows extending in a first direction defined by a plurality of convolutions extending in a radial direction;
    each convolution defined by two formed discs having respective spaced-apart portions,
    said discs having peripheral portions connected together;
    at least one of said discs having a flange member;
    said flange member defining an outer shield outwardly of said bellows and extending from said connected peripheral portions at an angle to said radial direction beyond the disc from which it extends.

12. A flexible coupling comprising:
    a bellows defined by a plurality of convolutions;
    each convolution defined by two formed discs having spaced-apart portions in an axial spaced distance and outer portions connected together;
    at least one of said discs having a respective flange member disposed outwardly of said connected outer portions;
    said respective flange member extending beyond said connected portion away from said convolution and defining an outer shield of said bellows,
    said flange member having a length greater than the axial distance between said discs.

\* \* \* \* \*